United States Patent
Matsuzaki et al.

(10) Patent No.: US 8,319,841 B2
(45) Date of Patent: Nov. 27, 2012

(54) VIDEO PROCESSING APPARATUS, VIDEO PROCESSING SYSTEM, VIDEO PROCESSING METHOD, AND PROGRAM

(75) Inventors: Eiichi Matsuzaki, Chofu (JP); Kenichi Morikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 476 days.

(21) Appl. No.: 12/276,821

(22) Filed: Nov. 24, 2008

(65) Prior Publication Data

US 2009/0160949 A1  Jun. 25, 2009

(30) Foreign Application Priority Data

Dec. 19, 2007  (JP) .................................. 2007-327985

(51) Int. Cl.
  *H04N 5/228*  (2006.01)
(52) U.S. Cl. .............. 348/208.4; 348/222.1; 348/333.01
(58) Field of Classification Search ............. 349/208.99, 349/222.1, 333.01
  See application file for complete search history.

(56) References Cited

U.S. PATENT DOCUMENTS

| | | | | |
|---|---|---|---|---|
| 6,130,709 A | * | 10/2000 | Sekine et al. | .............. 348/208.8 |
| 2002/0097324 A1 | * | 7/2002 | Onuki | ............................ 348/208 |
| 2007/0147706 A1 | * | 6/2007 | Sasaki et al. | ................... 382/295 |
| 2007/0285521 A1 | * | 12/2007 | Watanabe et al. | ........ 348/208.99 |

FOREIGN PATENT DOCUMENTS

| | | |
|---|---|---|
| JP | 04-268885 | 9/1992 |
| JP | 06-189176 | 7/1994 |
| JP | 10-042233 | 2/1998 |

* cited by examiner

*Primary Examiner* — Gevell Selby
(74) *Attorney, Agent, or Firm* — Cowan, Liebowitz & Latman, P.C.

(57) ABSTRACT

A video processing apparatus comprises a signal input unit which receives a video signal, a shift detection unit which detects a shift period in shooting and a maximum shift amount during the shift period from the video signal input from the signal input unit, an effective area detection unit which detects an object area common throughout the shift period as an effective area on the basis of the shift period and the maximum shift amount, a correction unit which corrects a shift during the shift period by reading out data from the effective area, and a resolution conversion unit which performs enlarge processing to convert a size of the effective area read out by the correction unit into an output image size.

6 Claims, 12 Drawing Sheets

VIDEO PROCESSING APPARATUS, VIDEO PROCESSING SYSTEM, VIDEO PROCESSING METHOD, AND PROGRAM

BACKGROUND OF THE INVENTION

1. Field of the Invention

The present invention relates to a technique of correcting an image shift caused by camera shake in an apparatus which records or plays back a video signal.

2. Description of the Related Art

Video recording apparatuses, such as a camera-integrated video recorder (to be referred to as a video camera hereinafter), which record a video signal obtained by sensing an object suffer a "camera shake phenomenon". That is, a sensed image shifts vertically and horizontally owing to small vibrations of the hand and arm. If the user keeps seeing an image suffering camera shake, he feels sick as if he got seasick. To prevent this, recent video cameras have a function of detecting camera shake to suppress an image shift caused by camera shake.

As a conventional method of detecting camera shake, there are known a method of obtaining a motion amount and motion direction from a previous frame by image processing, and a method of detecting vibrations of a video camera using a gyroscope. As a method of suppressing the "camera shake phenomenon", there are known a method of controlling the read area of image data rasterized in a memory, and a method of controlling the lens orientation in accordance with vibrations. There is also known a method of controlling the effective area of a video signal obtained by an image sensor such as a CCD (Charge Coupled Device) image sensor or a CMOS (Complementary Metal Oxide Semiconductor) image sensor.

However, according to the conventional camera shake suppressing method, even when panning is done to capture an image while horizontally moving a video camera, or tiling is done to capture an image while vertically moving it, the camera shake suppression acts, and the user cannot obtain an image he wants. According to the method of controlling the read area of image data rasterized in a memory or controlling the effective area of a video signal obtained by an image sensor, the effective area becomes narrow to suppress an image shift caused by camera shake. Data of pixels which become ineffective are compensated by image processing such as resolution conversion, degrading the image quality.

To solve these problems, Japanese Patent Laid-Open Nos. 6-189176 and 10-42233 propose a technique capable of selecting whether to validate or invalidate camera shake correction processing in accordance with the shooting status. According to this technique, a vibrating state detected in a video recording apparatus is recorded together with a video signal, and camera shake correction processing is executed in playback. Conventional camera shake correction processing is not adopted in all video cameras. Thus, Japanese Patent Laid-Open No. 4-268885 proposes a method of performing camera shake correction processing by a playback apparatus, and performing scan line interpolation to correct an image quality degraded by image processing such as resolution conversion, thereby obtaining a high-quality image signal.

The above-mentioned camera shake correction processing by a playback apparatus suppresses camera shake by controlling the effective area of image data rasterized in a memory in accordance with the motion amount obtained in real time. For this reason, the display size and the enlargement ratio in resolution conversion processing change every frame or field, and image data cannot be played back with a stable size and image quality. To ensure a stable size and image quality, the effective area in a memory needs to be set small in advance in accordance with a corresponding motion amount, similar to the conventional camera shake suppressing method using an image sensor. In this case, image data can be played back with the same size and image quality as long as the motion amount falls within a predetermined range. However, enlargement processing is always executed with a maximum correction amount regardless of the motion amount. Further, no camera shake correction processing can be done for a motion amount exceeding an assumed range.

SUMMARY OF THE INVENTION

The present invention has been made to overcome the conventional drawbacks, and has as its object to prevent degradation of shooting effects such as panning and tilting, and suppressing even changes in display size and image quality when correcting camera shake.

To solve the above-described problems and achieve the above-described object, according to the first aspect of the present invention, a video processing apparatus comprises a signal input unit which receives a video signal, a shift detection unit which detects a shift period in shooting and a maximum shift amount during the shift period from the video signal input from the signal input unit, an effective area detection unit which detects an object area common throughout the shift period as an effective area on the basis of the shift period and the maximum shift amount, a correction unit which corrects a shift during the shift period by reading out data from the effective area, and a resolution conversion unit which performs enlarge processing to convert a size of the effective area read out by the correction unit into an output image size.

According to the second aspect of the present invention, a video processing system comprises an image sensing apparatus which senses an object image to generate a video signal, and a display apparatus which displays a video signal generated by the image sensing apparatus, the image sensing apparatus comprising an image sensor which senses an object image, a shift detection unit which detects a shift period in shooting and a maximum shift amount during the shift period from a video signal generated by the image sensor, an effective area detection unit which detects an object area common throughout the shift period as an effective area on the basis of the shift period and the maximum shift amount, and a correction unit which corrects a shift during the shift period by reading out data from the effective area, and the display apparatus comprising an input unit which receives a video signal generated by the image sensing apparatus; and a resolution conversion unit which performs enlarge processing to convert a size of the effective area read out by the correction unit into an output image size.

According to the third aspect of the present invention, a video processing method comprises a signal input step of receiving a video signal, a shift detection step of detecting a shift period in shooting and a maximum shift amount during the shift period from the video signal input in the signal input step, an effective area detection step of detecting an object area common throughout the shift period as an effective area on the basis of the shift period and the maximum shift amount, a correction step of correcting a shift during the shift period by reading out data from the effective area, and a resolution conversion step of performing enlarge processing to convert a size of the effective area read out in the correction step into an output image size.

Further features of the present invention will become apparent from the following description of exemplary embodiments with reference to the attached drawings.

DESCRIPTION OF THE EMBODIMENTS

Preferred embodiments of the present invention will be described in detail below with reference to the accompanying drawings.

First Embodiment

Figure 1:
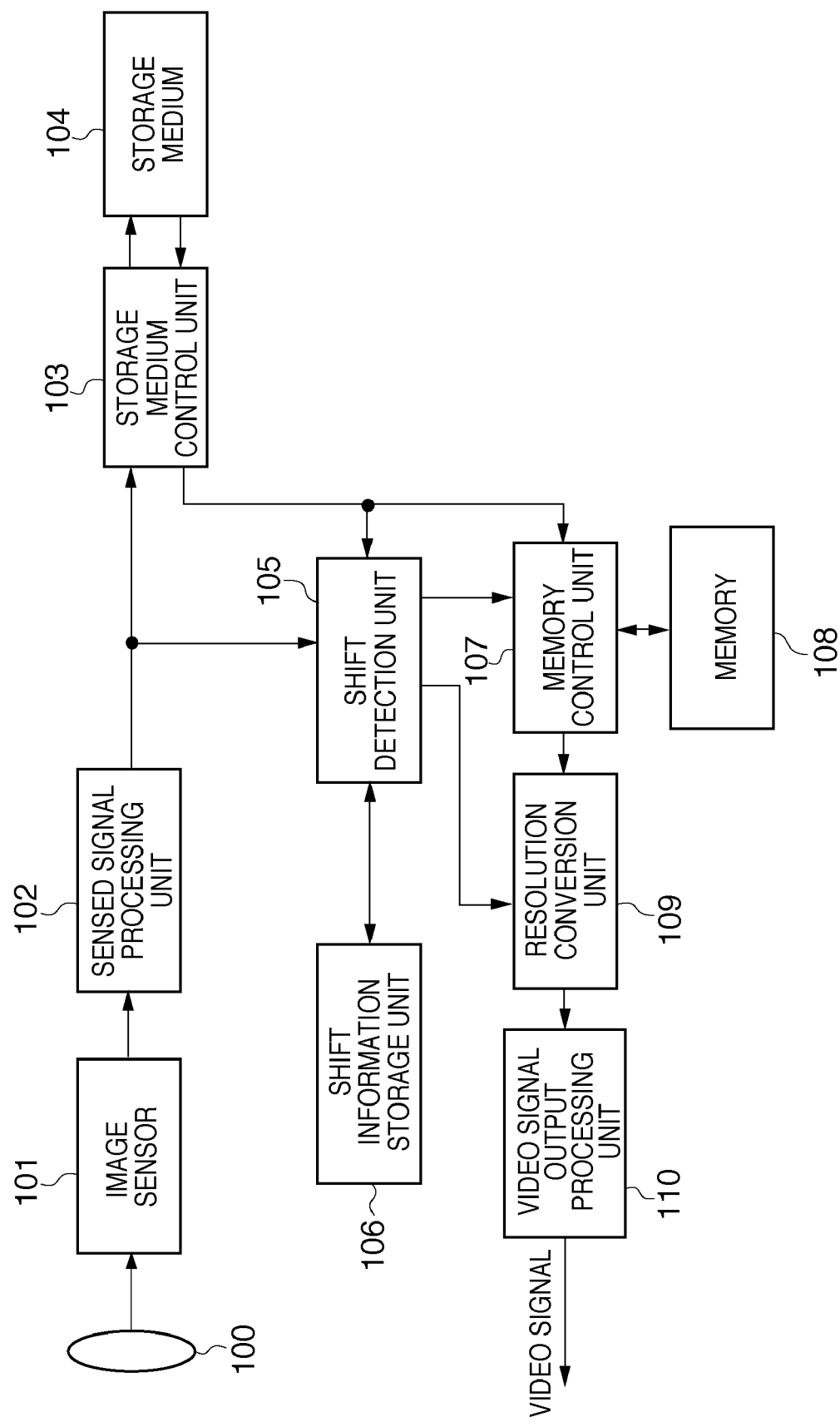
FIG. 1 is a block diagram showing the arrangement of a video recording apparatus according to the first embodiment of the present invention.

FIG. 1 is a block diagram showing the arrangement of a video recording apparatus (video processing apparatus) according to the first embodiment of the present invention.

Referring to FIG. 1, a lens 100 forms incoming light reflected by an object into an image. An image sensor 101 converts an object image formed by the lens 100 into an electrical signal. The image sensor 101 is formed from, e.g., a CCD image sensor or CMOS image sensor. A sensed signal processing unit 102 performs sampling and gain adjustment for an electrical signal obtained by the image sensor 101, and converts the processed signal into video data. The sensed signal processing unit 102 adds a synchronization signal to the video data and outputs the data as a video signal. A storage medium 104 can record video data output from the sensed signal processing unit 102 for a long time. The storage medium 104 is formed from, e.g., a magnetic recording tape, HDD (Hard Disk Drive), DVD (Digital Video Disk), or large-capacity memory element. A storage medium control unit 103 controls the storage medium 104. A memory 108 temporarily stores video data read out from the storage medium 104 under the control of the storage medium control unit 103. A memory control unit 107 controls the memory 108. A resolution conversion unit 109 converts the number of pixels of video data output from the memory control unit 107 into an output size. Video data processed by the resolution conversion unit 109 is output as a video signal together with a synchronization signal generated by a video signal output processing unit 110. A shift detection unit 105 detects a shift caused by camera shake in video data output from the sensed signal processing unit 102. A shift information storage unit 106 temporarily stores information detected by the shift detection unit 105.

The operation of the video recording apparatus having the above-described arrangement will be explained.

Video data which is captured by the lens 100 and image sensor 101, processed by the sensed signal processing unit 102, and output from it is input to the shift detection unit 105. At the same time, video data stored one frame period before a frame output from the sensed signal processing unit 102 is read out from the storage medium 104 under the control of the storage medium control unit 103, and input to the shift detection unit 105. The shift detection unit 105 detects the moving amount and moving direction of the entire frame from the video data output from the sensed signal processing unit 102, and the video data which has been input one frame period before the input frame and is output from the storage medium control unit 103. In the first embodiment, video data input one frame period before an input frame is read out from the storage medium 104. However, it is also possible to separately arrange a storage unit capable of storing video data of a plurality of frames, store input video data in the storage unit, and obtain video data input before one frame period from the storage unit. Video data of two frames can also be read out from the storage medium 104.

Figure 2:
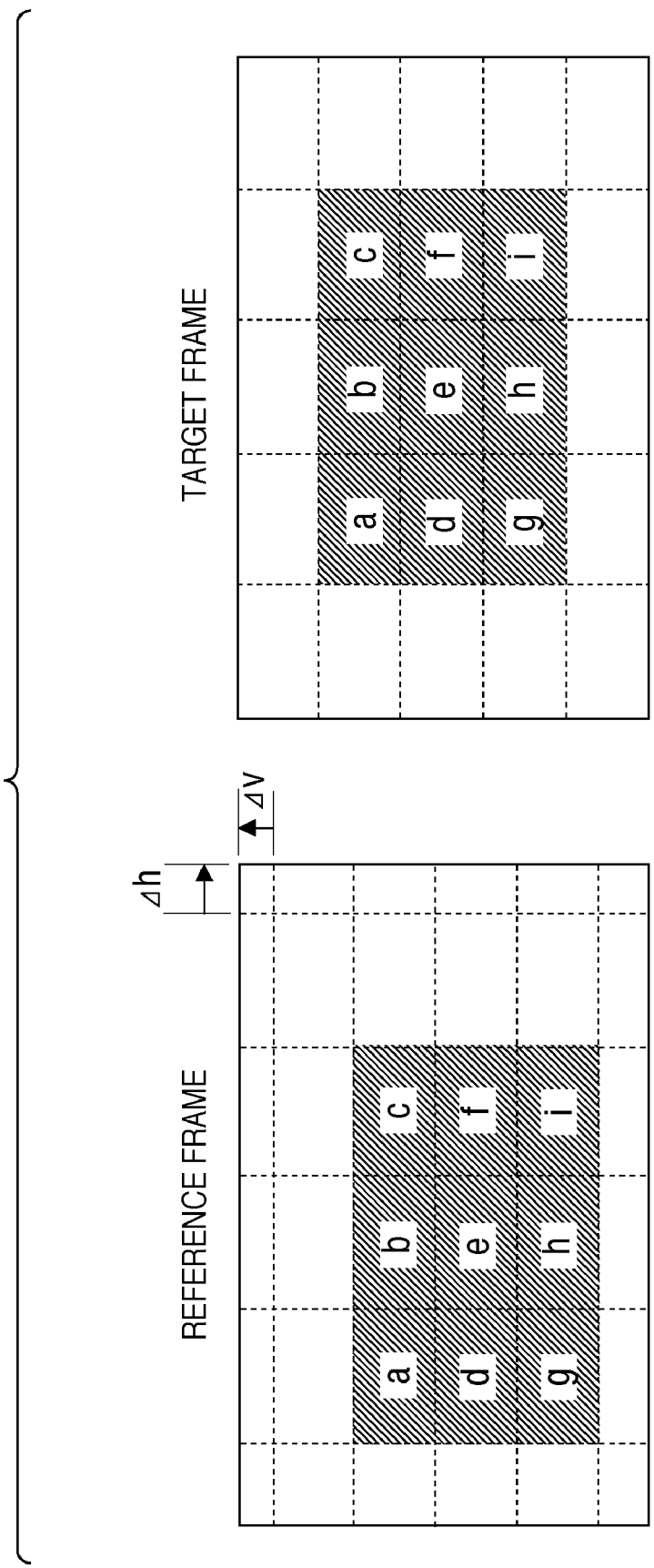
FIG. 2 is a schematic view showing a state in which the motion vector is obtained.

FIG. 2 is a schematic view showing a state in which the shift detection unit 105 detects a moving amount and moving direction.

In the first embodiment, a moving amount and moving direction from a preceding frame are detected using a conventional method of obtaining a motion vector, such as block matching. In motion vector detection by block matching, a target frame is divided into a plurality of blocks. Pixel values are compared to determine whether a reference frame includes a block having the same pixel value as that of each divided block. A motion vector is detected from the result. In FIG. 2, the target frame is an input frame, and the reference frame is a frame input before one frame period. The target frame is divided into 5×5 blocks, and each block undergoes block matching.

Referring to FIG. 2, the entire target frame shifts from the reference frame by Δh in the horizontal direction and Δv in the vertical direction. More specifically, when the motion vectors of 25 divided blocks are obtained while the entire frame periodically shifts owing to camera shake, the same moving amount and moving direction are detected from all the blocks. In the example of FIG. 2, attention is paid to inner blocks "a" to "i". Motion vectors indicating the same moving amount and moving direction are detected from all these blocks. It can then be detected from this result that the entire frame shifts in the same direction. This moving amount serves as the shift amount of the target frame from the reference frame.

Figure 3:
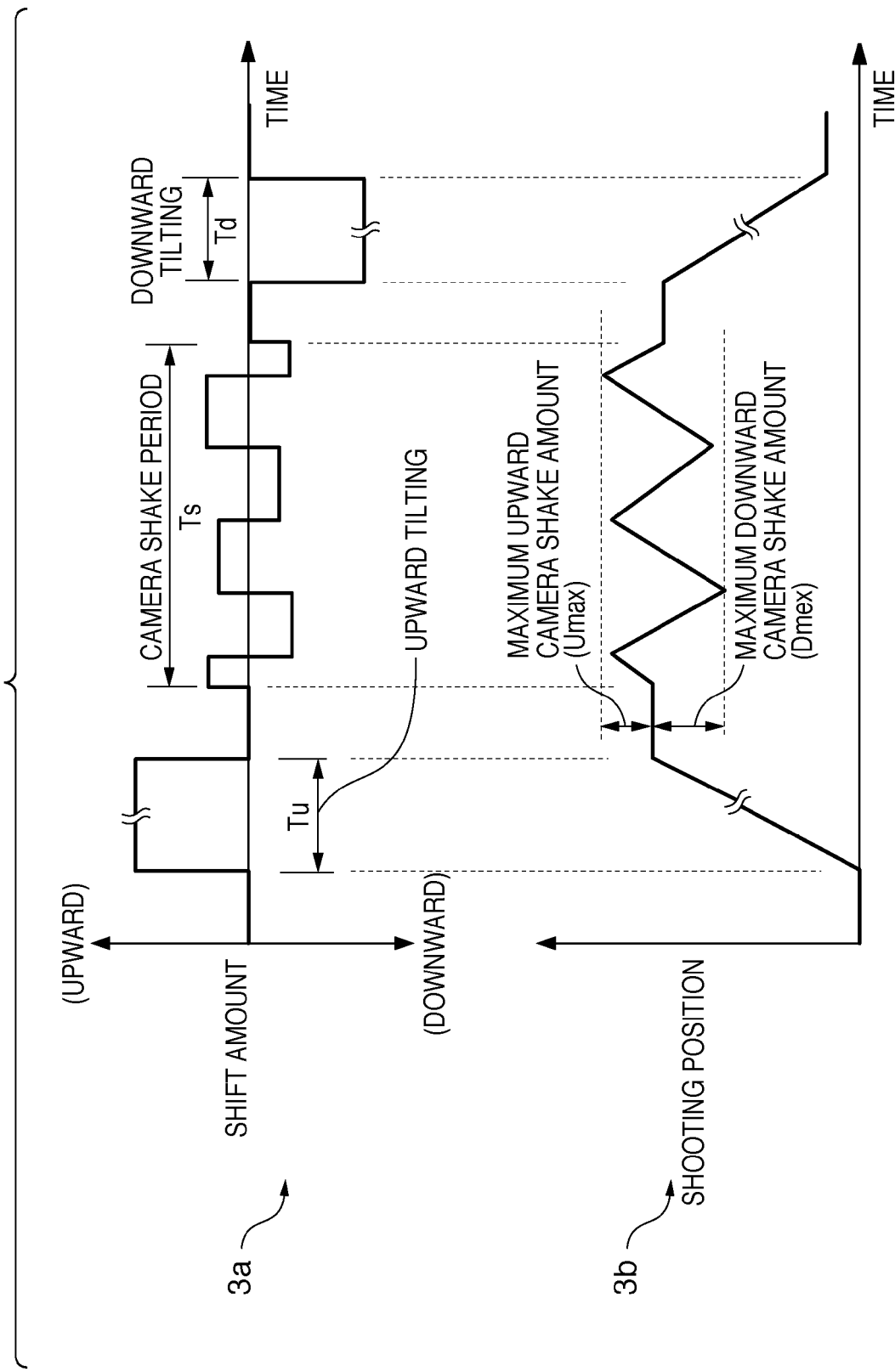
FIG. 3 is a timing chart showing a motion vector detected in a video recording apparatus.

FIG. 3 shows a change of the shift amount detected by the shift detection unit 105 with respect to the vertical shift of the entire frame. Although a change of the vertical shift amount will be explained, this also applies to a change of the horizontal shift amount.

Referring to FIG. 3, 3a represents a change of the shift amount detected by the shift detection unit 105, and 3b represents the motion of the video recording apparatus. More specifically, 3a represents a change of the shift amount of the target frame from the reference frame, which has been explained with reference to FIG. 2. In other words, this change corresponds to a relative shift amount per unit time. To the contrary, 3b represents a moving amount from a reference coordinate point (e.g., the center of the frame) at time 0 that is calculated by integrating relative shift amounts represented by 3a. This means that the moving amount of the video recording apparatus from time 0 is obtained.

In 3a, Tu represents a period during which upward tilting shooting is done, Ts represents a period during which camera shake occurs, and Td represents a period during which downward tilting shooting is done. That is, the shift amount and moving amount with respect to the elapsed time can be observed to distinguish the period during which camera shake occurs from the period during which tilting shooting is performed.

In the upward tilting shooting period Tu in 3a, an upward shift amount is detected continuously for a predetermined period. In the downward tilting shooting period Td, a downward shift amount is detected continuously for a predetermined period. In the camera shake generation period Ts, upward and downward short-period changes with a small shift amount are alternately successively detected. When the shift detection unit 105 repetitively detects upward and downward short-period changes with a small shift amount for a predetermined period, it determines that camera shake has occurred. The shift detection unit 105 determines, as a camera shake period, a period from the start to end of upward and downward shifts. The shift detection unit 105 obtains a maximum upward camera shake amount Umax and maximum downward camera shake amount Dmax during the camera shake period by using a moving amount immediately before determining that the current period is a camera shake period. The shift detection unit 105 stores the maximum upward camera shake amount Umax and maximum downward camera shake amount Dmax in the shift information storage unit 106 together with camera shake period information.

Figure 4:
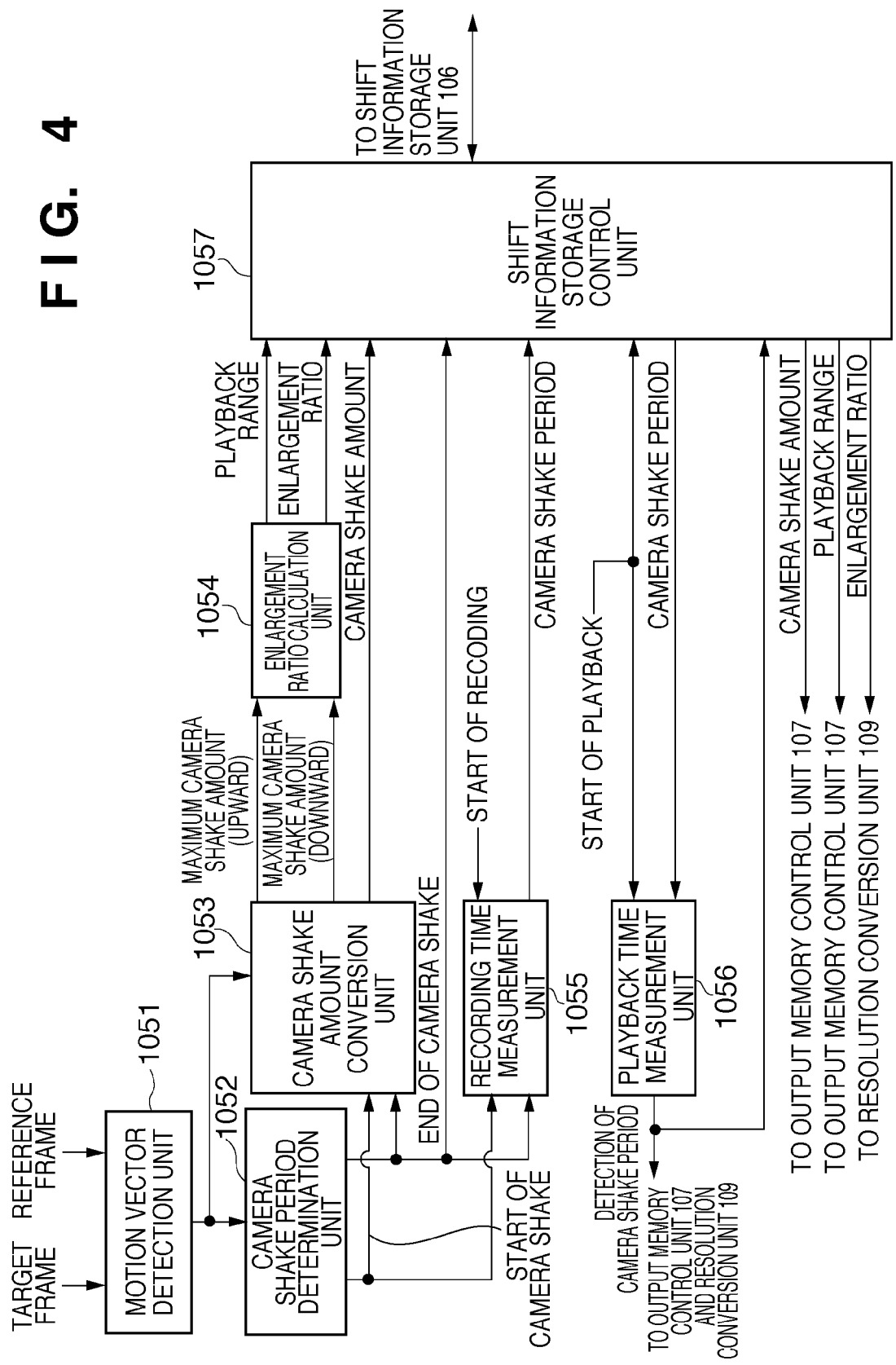
FIG. 4 is a block diagram showing an example of the arrangement of a shift detection unit.

FIG. 4 is a block diagram showing an example of the arrangement of the shift detection unit 105.

A motion vector detection unit 1051 obtains a motion vector shown in FIG. 2 from video data (target frame) output from the sensed signal processing unit 102 and video data (reference frame) of a preceding frame output from the storage medium control unit 103.

A camera shake period determination unit 1052 determines, from motion vector information output from the motion vector detection unit 1051, a period during which camera shake has occurred. More specifically, when an upward or downward short-period shift with a small shift amount is detected, as represented by 3a in FIG. 3, the camera shake period determination unit 1052 outputs camera shake start information. When upward and downward short-period shifts with a small shift amount are repetitively detected for a predetermined time, the camera shake period determination unit 1052 determines that camera shake has occurred. When no more short-period shift with a small shift amount can be detected, the camera shake period determination unit 1052 outputs camera shake end information. If neither upward nor downward short-period shift with a small shift amount can be detected before the detection period reaches a predetermined period, the camera shake period determination unit 1052 ends the determination of the camera shake period without outputting camera shake end information. The camera shake period determination unit 1052 resumes the determination again from detecting the start of a camera shake period. The camera shake period determination unit 1052 requires a predetermined time to detect the start of camera shake. Camera shake start information is output with a delay from the actual camera shake start timing. However, detection of the start of camera shake is not real-time processing. Hence, a delay circuit can adjust the output timing of camera shake start information to output of motion vector information at the camera shake start timing.

A recording time measurement unit 1055 measures the lapse of time from the start of recording. The recording time measurement unit 1055 starts measuring the recording time in response to a recording instruction from the user. When the camera shake period determination unit 1052 outputs camera shake start information, the recording time measurement unit 1055 stores a measurement time at this timing. When the camera shake period determination unit 1052 outputs camera shake end information, the recording time measurement unit 1055 outputs, as camera shake period information to a shift information storage control unit 1057, a measurement value at the timing when the camera shake start information is output and a measurement value at the timing when the camera shake end information is output. A time measurement means in the recording time measurement unit 1055 is implemented by, e.g., a timer for measuring a predetermined period, or a counter for counting synchronization signals of input video data.

A camera shake amount conversion unit 1053 converts motion vector information as represented by 3a of FIG. 3 output from the motion vector detection unit 1051 into moving amount information as represented by 3b to obtain the camera shake amount. In addition, the camera shake amount conversion unit 1053 obtains maximum upward and downward camera shake amounts during the camera shake period. That is, when the camera shake period determination unit 1052 outputs camera shake start information, the camera shake amount conversion unit 1053 outputs, to the shift information storage control unit 1057, camera shake amount information using moving amount information at this timing as a reference. At the same time, the camera shake amount conversion unit 1053 obtains maximum upward and downward amounts (i.e., Umax and Dmax) of camera shake amount information to be output to the shift information storage control unit 1057 until the camera shake period determination unit 1052 outputs camera shake end information. Then, the camera shake amount conversion unit 1053 outputs the maximum upward and downward amounts as maximum camera shake amount information to an enlargement ratio calculation unit 1054. From the maximum camera shake amount information output from the camera shake amount conversion unit 1053, the enlargement ratio calculation unit 1054 obtains and outputs playback range information to be used by the memory control unit 107, and enlargement ratio information to be used by the resolution conversion unit 109.

Figure 5:
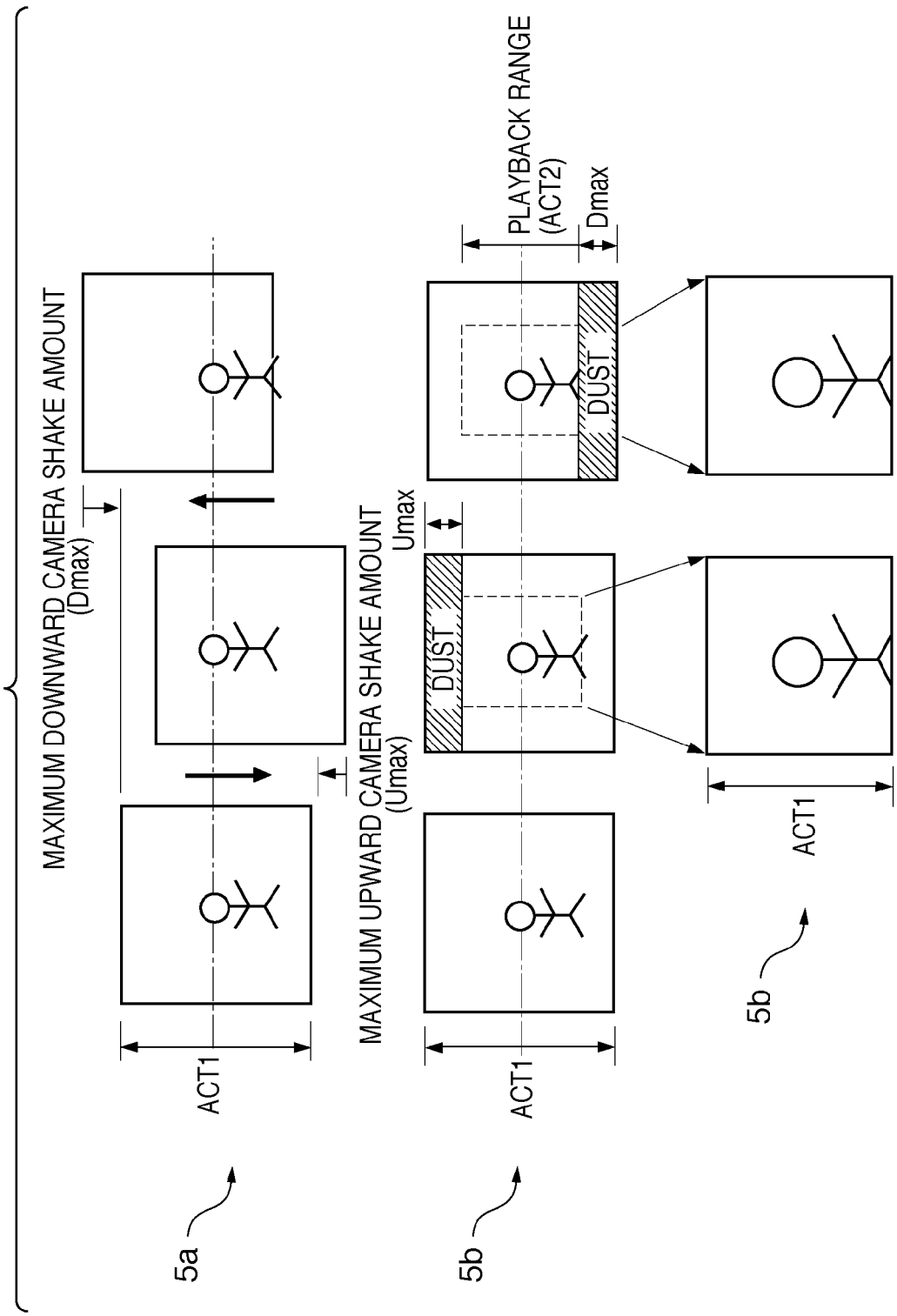
FIG. 5 is a schematic view showing a state in which camera shake is corrected.

FIG. 5 is a view showing a state in which playback range information and enlargement ratio information are obtained by the enlargement ratio calculation unit 1054, and respectively used by the memory control unit 107 and resolution conversion unit 109 to correct camera shake.

In FIG. 5, 5a represents the relationship between maximum camera shake amount information output from the camera shake amount conversion unit 1053, and video data which is captured by the lens 100 and image sensor 101, processed by the sensed signal processing unit 102, and output from it. Also, 5b represents video data which undergoes camera shake correction processing and is output from the memory control unit 107. Further, 5c represents video data having undergone resolution conversion processing by the resolution conversion unit 109. Also in FIG. 5, only a vertical shift will be explained for descriptive convenience, but this also applies to a horizontal shift.

In 5a, the left image is an image before camera shake occurs, the center image is an image when the video recording apparatus shifts downward at maximum during the camera shake period, and the right image is an image when the video recording apparatus shifts upward at maximum during the camera shake period. Each thick arrow indicates the shift direction of the video recording apparatus, and each thin arrow indicates maximum camera shake amount information obtained by the camera shake amount conversion unit 1053. As represented by 5a, the directions of maximum upward camera shake amount information and maximum downward camera shake amount information obtained by the camera shake amount conversion unit 1053 are opposite to the shift directions of the video recording apparatus. More specifically, the maximum upward camera shake amount information Umax is obtained from the center image when the video recording apparatus shifts downward at maximum. The maximum downward camera shake amount information Dmax is obtained from the right image when the video recording apparatus shifts upward at maximum. If the memory control unit 107 executes camera shake correction processing in accordance with the camera shake amount information to read out video data from the memory 108, an area (represented as "garbage" in FIG. 5) having no video data is contained in the memory 108, as represented by 5b. When this area is played back, the display quality becomes poor. To prevent this, the memory control unit 107 must read out video data (effective area: an object area common throughout the camera shake period) of a range including no "garbage" area from the memory 108 (effective area detection), as represented by 5b, and output it to the resolution conversion unit 109. When camera shake correction processing and enlarge processing are performed for each frame to output the resultant frame to the resolution conversion unit 109, the display size changes for each frame and the display becomes poor because the camera shake amount differs between frames. To prevent this, in the first embodiment, the enlargement ratio calculation unit 1054 obtains playback range information and enlargement ratio information during the camera shake period from pieces of maximum upward and downward camera shake amount information obtained during the camera shake period by the camera shake amount conversion unit 1053. In playback, read from the memory 108 and enlarge processing by the resolution conversion unit 109 are controlled based on the playback range information and enlargement ratio information obtained by the enlargement ratio calculation unit 1054. As a result, camera shake-corrected stable video data can be obtained during the camera shake period.

Referring back to FIG. 4, the enlargement ratio calculation unit 1054 obtains playback range information ACT2 and enlargement ratio information at that timing from the maximum upward camera shake amount information Umax and maximum downward camera shake amount information Dmax during the camera shake period that are output from the camera shake amount conversion unit 1053. Letting "ACT1" be the vertical size of video data which is recorded on the storage medium 104 and output in playback, the playback range information ACT2 and enlargement ratio information at that timing are given by playback range information $ACT2=ACT1-(Umax+Dmax)$ enlargement ratio information $=ACT1/ACT2$ The playback range information and enlargement ratio information obtained by the enlargement ratio calculation unit 1054 are stored in the shift information storage unit 106 via the shift information storage control unit 1057. The shift information storage control unit 1057 controls write/read, in/from the shift information storage unit 106, of camera shake amount information output from the camera shake amount conversion unit 1053 for each frame, playback range information and enlargement ratio information output from the enlargement ratio calculation unit 1054, and camera shake period information output from the recording time measurement unit 1055. More specifically, the shift information storage control unit 1057 stores camera shake amount information output from the camera shake amount conversion unit 1053 in the shift information storage unit 106 for each frame. At the same time, the shift information storage control unit 1057 stores, in the shift information storage unit 106, playback range information and enlargement ratio information output from the enlargement ratio calculation unit 1054 and camera shake period information output from the recording time measurement unit 1055 when the camera shake period determination unit 1052 outputs camera shake end information. After that, if the user designates playback of video data recorded on the storage medium 104, the shift information storage control unit 1057 reads out the camera shake amount information from the shift information storage unit 106 for each frame, and outputs it to the memory control unit 107. At the same time, the shift information storage control unit 1057 outputs the playback range information and enlargement ratio information read out from the shift information storage unit 106 to the memory control unit 107 and resolution conversion unit 109, respectively. In addition, the shift information storage control unit 1057 outputs the camera shake period information to a playback time measurement unit 1056. The playback time measurement unit 1056 measures the time elapsed from the start of playback. When the user designates playback, the playback time measurement unit 1056 starts measuring the playback time, and compares the playback time with camera shake period information output from the shift information storage control unit 1057. When the playback time measurement unit 1056 determines that the playback time coincides with the camera shake period information, it outputs a camera shake period detection signal to the memory control unit 107, resolution conversion unit 109, and shift information storage control unit 1057. A time measurement means in the playback time measurement unit 1056 is implemented by, e.g., a timer for measuring a predetermined period, or a counter for counting synchronization signals of input video data, similar to the recording time measurement unit 1055. In response to the end of outputting a camera shake period detection signal, the shift information storage control unit 1057 reads out the next camera shake period information, playback range information, and enlargement ratio information from the shift information storage unit 106, and outputs them.

Referring back to FIG. 1, video data which is captured by the lens 100 and image sensor 101, processed by the sensed signal processing unit 102, and output from it is also input to the storage medium control unit 103 and recorded on the storage medium 104. After that, if the user designates playback of the video data recorded on the storage medium 104, the storage medium control unit 103 reads out the recorded video data from the storage medium 104, and outputs it to the memory control unit 107. The memory control unit 107 temporarily stores the video data output from the storage medium control unit 103 in the memory 108. When the shift detection unit 105 outputs a camera shake period detection signal, the memory control unit 107 calculates address information in which camera shake has been corrected in accordance with the camera shake amount information output from the shift detection unit 105. Further, the memory control unit 107 reads out video data from the memory 108 in accordance with playback range information output from the shift detection unit 105, and outputs it to the resolution conversion unit 109. When the shift detection unit 105 outputs a camera shake period detection signal, the resolution conversion unit 109 converts the number of pixels of video data output from the memory control unit 107 into an original output size in accordance with enlargement ratio information output from the shift detection unit 105, as represented by 5c of FIG. 5. Then, the resolution conversion unit 109 outputs the converted video data. The video data output from the resolution conversion unit 109 is output as a video signal together with a synchronization signal generated by the video signal output processing unit 110.

According to the above-described arrangement, an optimum playback size is calculated to perform playback processing for the duration in which camera shake has occurred, unlike the conventional method of correcting camera shake for each frame and outputting the corrected frame. In playback of data in which camera shake has occurred, playback of unnecessary data other than video data can be avoided, and video data can be output with a stable playback size. Motion of an object in the same direction, like panning or tilting, is not determined as camera shake. Thus, playback video data can be obtained without impairing shooting effects.

In the first embodiment, a shift of the video recording apparatus is detected from a motion vector obtained by block matching between frames. However, an acceleration sensor such as a gyroscope may also be assembled into the video recording apparatus to detect a shift of the video recording apparatus.

Figure 6:
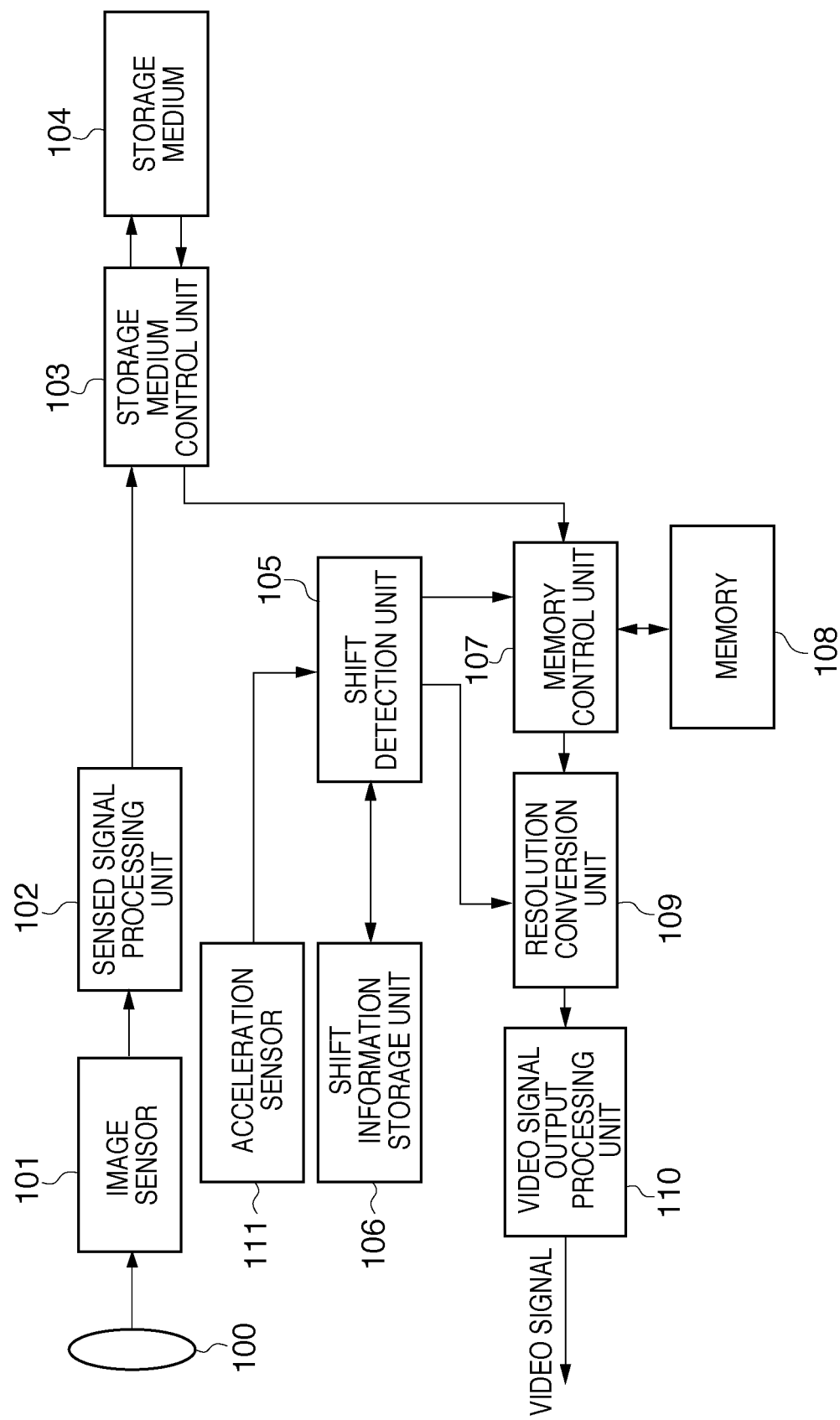
FIG. 6 is a block diagram showing another example of the arrangement of the video recording apparatus according to the first embodiment of the present invention.

FIG. 6 is a block diagram showing the arrangement of a video recording apparatus using an acceleration sensor.

In FIG. 6, an acceleration sensor 111 detects a shift of the video recording apparatus. Shift information obtained from the acceleration sensor 111 is input to the shift detection unit 105. In this case, detection information from the acceleration sensor is used instead of motion vector information output from the motion vector detection unit 1051 shown in FIG. 4.

Information stored in the shift information storage unit 106 in the first embodiment may also be stored in the storage medium 104. In this arrangement, information detected by the shift detection unit 105 is stored in the storage medium 104 via the storage medium control unit 103, read out from the storage medium 104 in playback, and output to the memory control unit 107 and resolution conversion unit 109.

Second Embodiment

Figure 7:
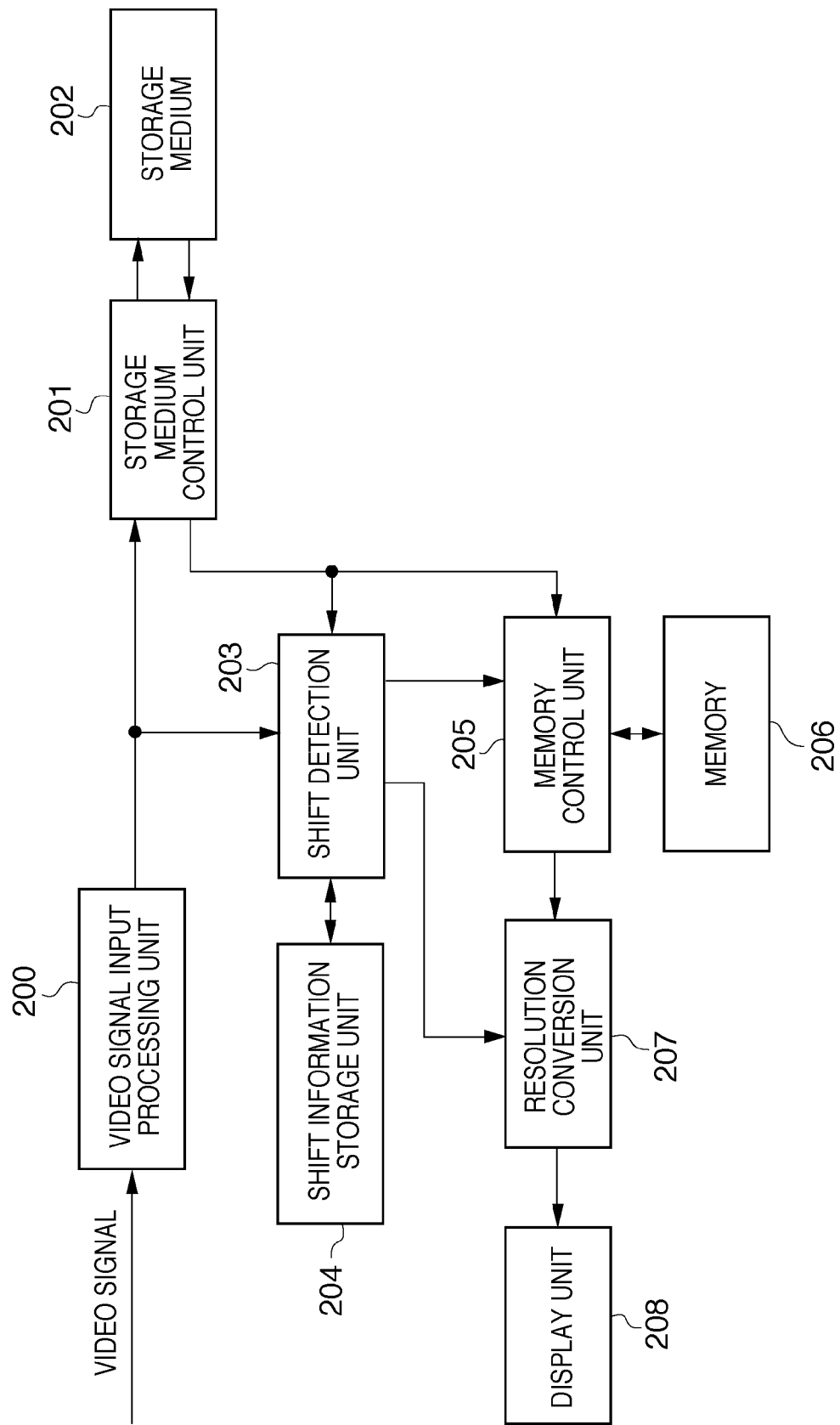
FIG. 7 is a block diagram showing the arrangement of a video display apparatus according to the second embodiment of the present invention.

FIG. 7 is a block diagram showing the arrangement of a video display apparatus according to the second embodiment of the present invention.

In FIG. 7, a video signal input processing unit 200 performs signal processing to separate a synchronization signal from an input video signal and digitize video data input as an analog signal. A storage medium 202 can record video data output from the video signal input processing unit 200 for a long time. The storage medium 202 is formed from, e.g., a magnetic recording tape, HDD (Hard Disk Drive), DVD (Digital Video Disk), or large-capacity memory element. A storage medium control unit 201 controls the storage medium 202. A memory 206 temporarily stores video data read out from the storage medium 202 under the control of the storage medium control unit 201. A memory control unit 205 controls the memory 206. A resolution conversion unit 207 converts the number of pixels of video data output from the memory control unit 205 in accordance with the display size. A display unit 208 displays video data processed by the resolution conversion unit 207. A shift detection unit 203 detects a shift caused by camera shake in video data output from the video signal input processing unit 200. A shift information storage unit 204 temporarily stores information detected by the shift detection unit.

The operation of the video display apparatus having the above-described arrangement will be explained.

Video data which is processed by the video signal input processing unit 200 and output from it is input to the shift detection unit 203. At the same time, video data stored one frame period before a frame output from the video signal input processing unit 200 is read out from the storage medium 202 under the control of the storage medium control unit 201, and input to the shift detection unit 203. The shift detection unit 203 detects the moving amount and moving direction of the entire frame from the video data output from the video signal input processing unit 200, and the video data which has been input one frame period before the input frame and is output from the storage medium control unit 201. Also in the second embodiment, similar to the first embodiment, it is also possible to separately arrange a storage unit capable of storing video data of a plurality of frames, store input video data in the storage unit, and obtain video data input before one frame period from the storage unit. Video data of two frames can also be read out from the storage medium 202.

Similar to the shift detection unit 105 in the video recording apparatus described in the first embodiment, the shift detection unit 203 detects the moving amount and moving direction of the entire frame by obtaining the motion vector of each block by block matching. The shift detection unit 203 is also implemented by the same arrangement as that of the shift detection unit 105 shown in FIG. 4 in the video recording apparatus described in the first embodiment. More specifically, the shift detection unit 203 obtains a motion vector shown in FIG. 2 from video data (target frame) output from the video signal input processing unit 200 and video data (reference frame) of a preceding frame output from the storage medium control unit 201. The shift detection unit 203 determines, from the motion vector information, a period during which camera shake has occurred, and generates camera shake period information. The shift detection unit 203 converts the motion vector information into moving amount information as represented by 3b in FIG. 3 to obtain camera shake amount information. Further, the shift detection unit 203 generates display range information and enlargement ratio information from the maximum value of camera shake amount information during the camera shake generation period. The camera shake amount information, display range information, enlargement ratio information, and camera shake period information obtained by the shift detection unit 203 are temporarily stored in the shift information storage unit 204.

Thereafter, if the user designates display of video data stored in the storage medium 202, the shift detection unit 203 reads out the camera shake amount information from the shift information storage unit 204 for each frame, and outputs it to the memory control unit 205. At the same time, the shift detection unit 203 outputs the display range information and enlargement ratio information read out from the shift information storage unit 204 to the memory control unit 205 and resolution conversion unit 207, respectively. In addition, the shift detection unit 203 determines, from the camera shake period information read out from the shift information storage unit 204, whether the video data displayed corresponds to the camera shake generation period. If the shift detection unit 203 determines that the video data displayed corresponds to the camera shake generation period, it outputs a camera shake period detection signal to the memory control unit 205 and resolution conversion unit 207. When the shift detection unit 203 detects the end of the display corresponding to the camera shake generation period, it reads out the next camera shake period information, display range information, and enlargement ratio information from the shift information storage unit 204, and executes the above-described processing.

Video data output from the video signal input processing unit 200 is also input to the storage medium control unit 201 and recorded on the storage medium 202. After that, if the user designates display of the video data recorded on the storage medium 202, the storage medium control unit 201 reads out the recorded video data from the storage medium 202, and outputs it to the memory control unit 205. The memory control unit 205 temporarily stores the video data output from the storage medium control unit 201 in the memory 206. When the shift detection unit 203 outputs a camera shake period detection signal, the memory control unit 205 calculates address information in which camera shake has been corrected in accordance with the camera shake amount information output from the shift detection unit 203. Further, the memory control unit 205 reads out video data from the memory 206 in accordance with display range information output from the shift detection unit 203, and outputs it to the resolution conversion unit 207. When the shift detection unit 203 outputs a camera shake period detection signal, the resolution conversion unit 207 converts the number of pixels of video data output from the memory control unit 205 into an original display size in accordance with enlargement ratio information output from the shift detection unit 203, as represented by 5c of FIG. 5. Then, the resolution conversion unit 207 outputs the converted video data. The video data output from the resolution conversion unit 207 is output to the display unit 208, and displayed.

According to the above-described arrangement, even in a video display apparatus such as a television set, an optimum display size is calculated to perform display processing for the period in which camera shake has occurred. In display for the period in which camera shake has occurred, display of unnecessary data other than video data can be avoided. In addition, a display which suppresses a shift of the entire frame caused by camera shake can be provided with a stable display size.

In the second embodiment, input video data is first stored in the storage medium 202. Camera shake amount information, display range information, enlargement ratio information, and camera shake period information obtained by the shift detection unit 203 are processed in advance and stored in the shift information storage unit 204. After that, if the user designates display of video data, the above-mentioned processing is executed to enlarge an image free from blurring and display it on the display unit. As a modification of this arrangement, for example, the storage medium 202 may also be implemented by a memory with a capacity determined in accordance with an expected maximum camera shake period. This arrangement can display an image free from blurring on the display unit 208 with a delay as short as the expected maximum camera shake period in accordance with a video signal input to the video signal input processing unit 200. That is, as long as a frame corresponding to the camera shake period in FIG. 3 can be prefetched, the frames of this period can undergo the processing in FIG. 5 and be output. In this case, not all video data need be stored in the storage medium. Hence, the second embodiment is preferably applied to a video display apparatus like a television set.

Third Embodiment

In the first embodiment, an image shift is detected prior to playback. A period during which camera shake has occurred, and a maximum shift amount during this period are obtained from the detected shift information. An optimum playback size during the corresponding period is obtained from the maximum shift amount, and memory read processing and enlarge processing are performed. As a result, an optimum playback image quality can be attained during the detected camera shake period without impairing shooting effects such as panning and tilting. In the second embodiment, an image shift is detected prior to display. A period during which camera shake has occurred, and a maximum shift amount during this period are obtained from the detected shift information. An optimum display size during the corresponding period is obtained from the maximum shift amount, and memory read processing and enlarge processing are performed. An optimum display image quality can be attained during the detected camera shake period.

In an example of the arrangement of the video recording apparatus or video display apparatus described in the first or second embodiment, camera shake correction processing is executed in playback or display. For example, when the storage medium is detachable from the main body, information (camera shake amount information, camera shake period detection information, playback (display) range information, and enlargement ratio information) for performing camera shake correction processing need be stored in the storage medium. When playing back or displaying data from the storage medium, an apparatus cannot execute camera shake correction processing unless it has the arrangement of the video recording apparatus or video display apparatus described in the first or second embodiment.

In the third embodiment, camera shake correction processing is done for video data stored in a storage medium prior to playback or display, and the processed video data is written back in the storage medium. This obviates the need to store information in the storage medium in order to perform camera shake correction processing. Since video data stored in the storage medium is one having undergone camera shake correction processing, a high-quality image in which generation of camera shake is suppressed can be displayed regardless of the video recording apparatus for playback or the video display apparatus for display.

Figure 8:
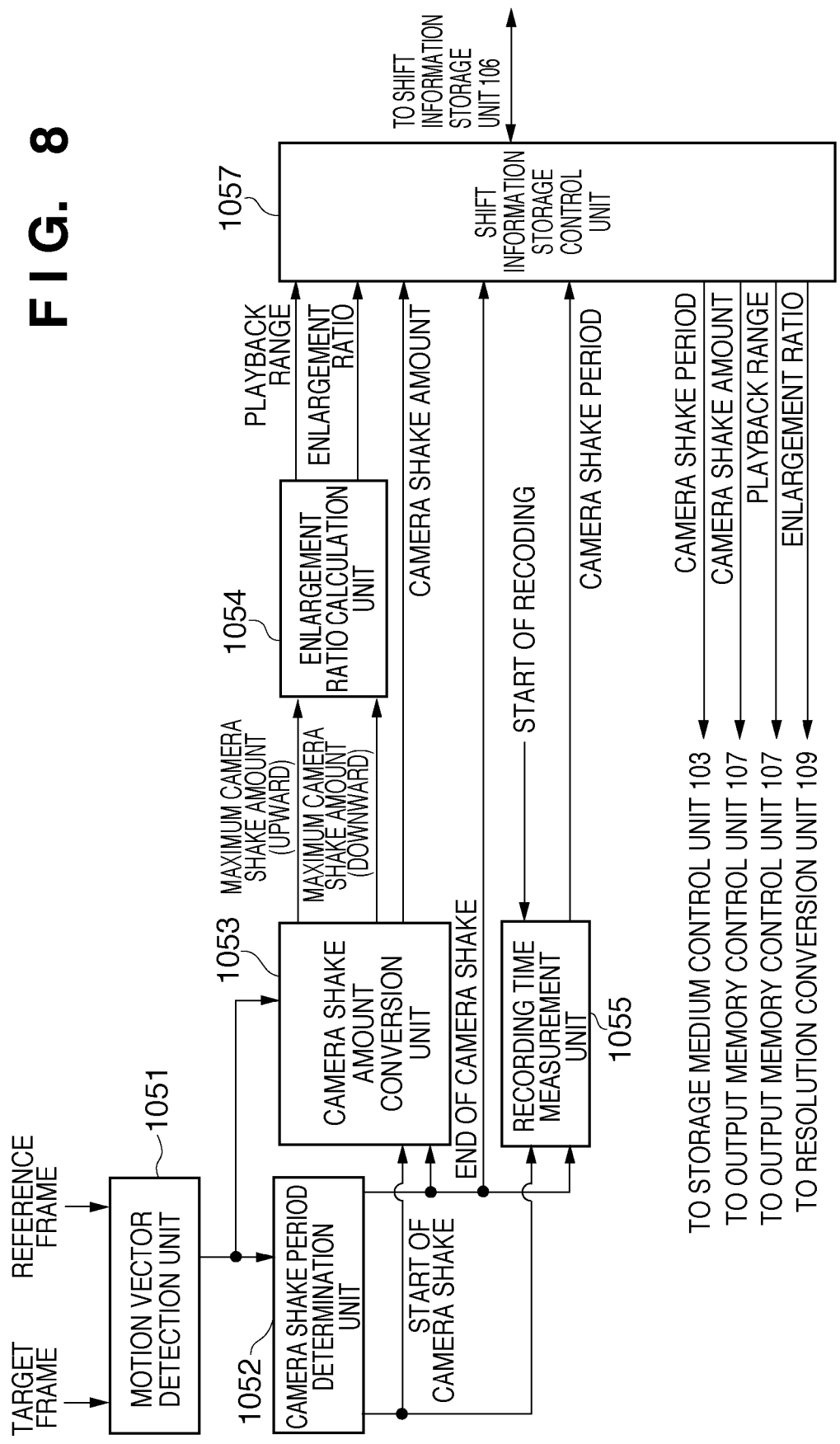
FIG. 8 is a block diagram showing an example of the arrangement of a shift detection unit according to the third embodiment of the present invention.

FIG. 8 is a block diagram showing an example of the arrangement of a shift detection unit 105 in the third embodiment. The playback time measurement unit 1056 is omitted from the arrangement of the shift detection unit 105 shown in FIG. 4 in the first embodiment. Camera shake period information is output to a storage medium control unit 103, instead of outputting a camera shake period detection signal to a memory control unit 107 and resolution conversion unit 109. The remaining arrangement is the same as that shown in FIG. 4.

Figure 9:
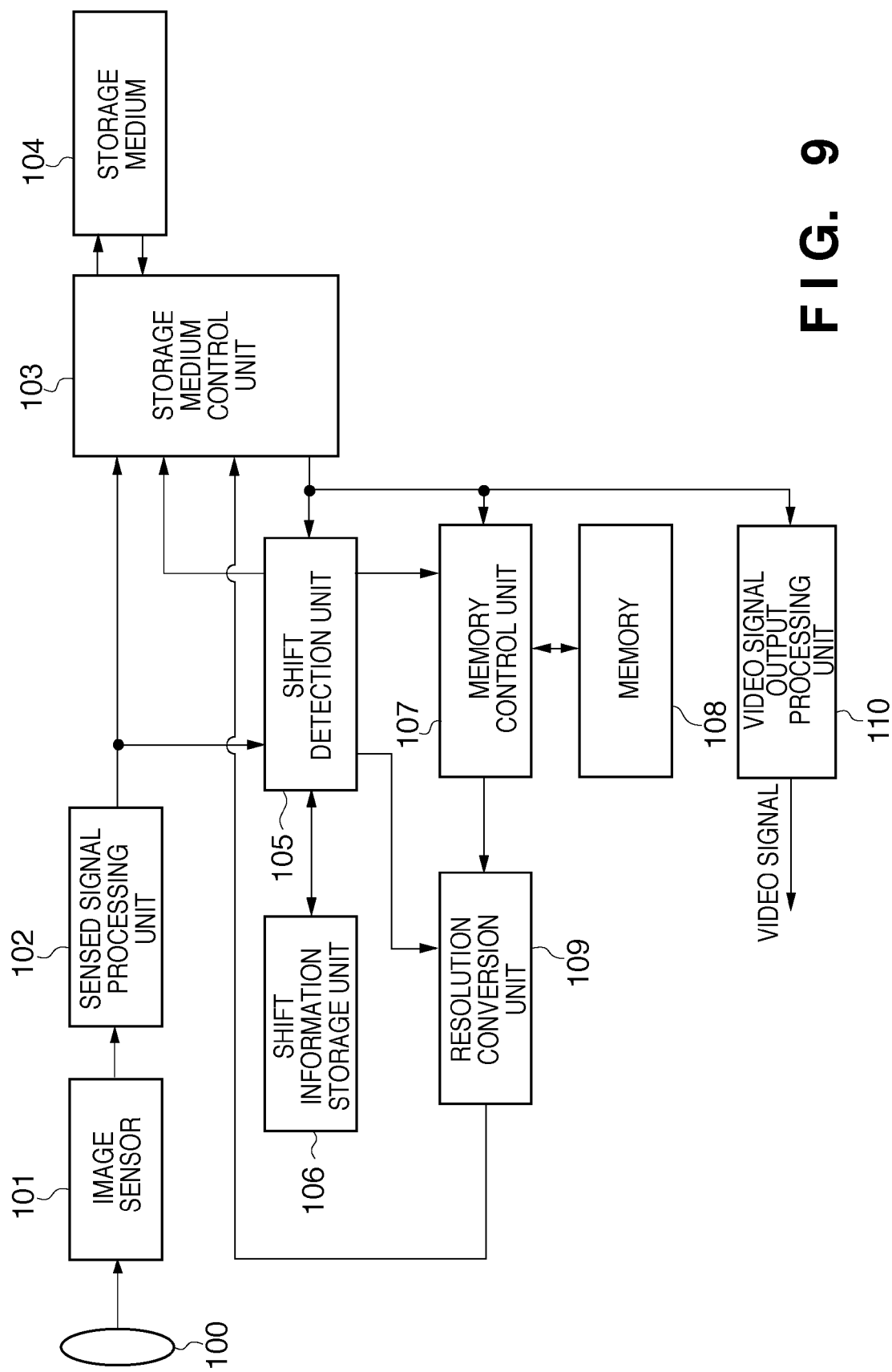
FIG. 9 is a block diagram showing the arrangement of a video recording apparatus according to the third embodiment of the present invention.

FIG. 9 is a block diagram showing the arrangement of a video recording apparatus according to the third embodiment. Unlike the video recording apparatus in the first embodiment, video data output from the resolution conversion unit 109 is input to the storage medium control unit 103. Camera shake period information detected by the shift detection unit 105 is also input to the storage medium control unit 103. Camera shake amount information and playback range information detected by the shift detection unit 105 are input to the memory control unit 107. Enlargement ratio information detected by the shift detection unit 105 is input to the resolution conversion unit 109. Video data output from the storage medium control unit 103 is input to a video signal output processing unit 110. The remaining arrangement is the same as that shown in FIG. 1.

The operation of the video recording apparatus having the above-described arrangement will be explained.

The operation until video data which is captured by a lens 100 and image sensor 101, processed by a sensed signal processing unit 102, and output from it is stored in a storage medium 104 via the storage medium control unit 103 is the same as that described with reference to FIG. 1, and a description thereof will not be repeated. The operation until the shift detection unit 105 obtains a motion vector shown in FIG. 2 from video data (target frame) output from the sensed signal processing unit 102 and video data (reference frame) of a preceding frame output from the storage medium control unit 103, and the operation until the shift detection unit 105 detects camera shake amount information, camera shake period information, playback range information, and enlargement ratio information from the motion vector information, and stores these pieces of information in a shift information storage unit 106 are also the same as those described with reference to FIG. 1, and a description thereof will not be repeated.

In the video recording apparatus according to the third embodiment, video data which is captured by the lens 100 and image sensor 101, processed by the sensed signal processing unit 102, and output from it is stored in the storage medium 104 in accordance with a recording instruction from the user. When the shift information storage unit 106 stores information for performing camera shake correction processing, the storage medium control unit 103 reads out video data from the storage medium 104 and outputs it to the memory control unit 107 in accordance with camera shake period information output from the shift detection unit 105 prior to a playback instruction from the user. The memory control unit 107 temporarily stores the video data output from the storage medium control unit 103 in a memory 108. Then, the memory control unit 107 calculates address information in which camera shake has been corrected in accordance with the camera shake amount information output from the shift detection unit 105. Further, the memory control unit 107 reads out video data from the memory 108 in accordance with playback range information output from the shift detection unit 105, and outputs it to the resolution conversion unit 109. The resolution conversion unit 109 converts the number of pixels of video data output from the memory control unit 107 into an original output size in accordance with enlargement ratio information output from the shift detection unit 105, as represented by 5*c* of FIG. 5. Then, the resolution conversion unit 109 outputs the converted video data. The video data output from the resolution conversion unit 109 is returned again to the storage medium control unit 103, and stored in the storage medium 104 in place of the readout video data.

When the user designates playback of video data recorded on the storage medium 104, the storage medium control unit 103 reads out camera shake-corrected video data from the storage medium 104, and outputs it to the video signal output processing unit 110. The camera shake-corrected video data is output together with a synchronization signal generated by the video signal output processing unit 110.

The above-described arrangement is also applicable to the video display apparatus shown in FIG. 7 in the second embodiment. The arrangement of the shift detection unit 203 in the video display apparatus is also implemented by the same arrangement as that of the shift detection unit 105 shown in FIG. 8.

Figure 10:
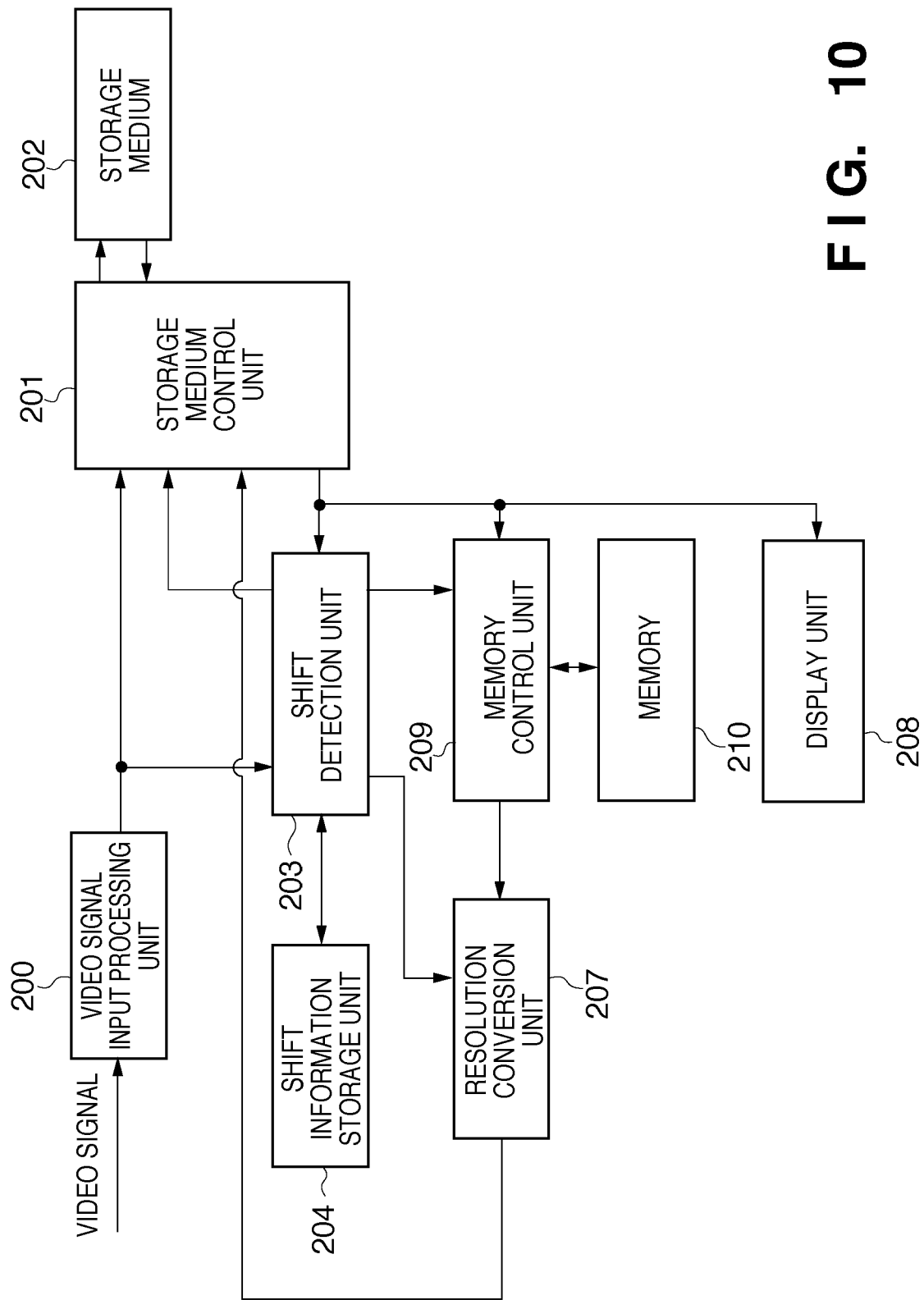
FIG. 10 is a block diagram showing the arrangement of a video display apparatus according to the third embodiment of the present invention.

FIG. 10 is a block diagram showing the arrangement of a video display apparatus according to the third embodiment. Unlike the video display apparatus shown in FIG. 7 in the second embodiment, video data output from a resolution conversion unit 207 is input to a storage medium control unit 201. Camera shake period information detected by a shift detection unit 203 is also input to the storage medium control unit 201. Camera shake amount information and display range information detected by the shift detection unit 203 are input to a memory control unit 205. Enlargement ratio information detected by the shift detection unit 203 is input to the resolution conversion unit 207. Video data output from the storage medium control unit 201 is input to a display unit 208. The remaining arrangement is the same as that shown in FIG. 7.

The operation of the video display apparatus having the above-described arrangement will be explained.

The operation until video data output from a video signal input processing unit 200 is stored in a storage medium 202 via the storage medium control unit 201, and the operation until the shift detection unit 203 obtains a motion vector shown in FIG. 2 from video data (target frame) output from the video signal input processing unit 200 and video data (reference frame) of a preceding frame output from the storage medium control unit 201, detects camera shake amount information, camera shake period information, display range information, and enlargement ratio information from the motion vector information, and stores these pieces of information in a shift information storage unit 204 are also the same as those described with reference to FIG. 7, and a description thereof will not be repeated.

In the video display apparatus according to the third embodiment, video data output from the video signal input processing unit 200 is stored in the storage medium 202. When the shift information storage unit 204 stores information for performing camera shake correction processing, the storage medium control unit 201 reads out video data from the storage medium 202 and outputs it to the memory control unit 205 in accordance with camera shake period information output from the shift detection unit 203 prior to a display instruction from the user. The memory control unit 205 temporarily stores the video data output from the storage medium control unit 201 in a memory 210. Then, the memory control unit 205 calculates address information in which camera shake has been corrected in accordance with the camera shake amount information output from the shift detection unit 203. Further, the memory control unit 205 reads out video data from the memory 210 in accordance with display range information output from the shift detection unit 203, and outputs it to the resolution conversion unit 207. The resolution conversion unit 207 converts the number of pixels of video data output from the memory control unit 205 into an original output size in accordance with enlargement ratio information output from the shift detection unit 203, as represented by 5*c* of FIG. 5. Then, the resolution conversion unit 207 outputs the converted video data. The video data output from the resolution conversion unit 207 is returned again to the storage medium control unit 201, and stored in the storage medium 202 in place of the readout video data.

When the user designates display of video data recorded on the storage medium 202, the storage medium control unit 201 reads out camera shake-corrected video data from the storage medium 202, and outputs it to the display unit 208. The display unit 208 displays the video data.

In the above-described arrangement, video data having undergone camera shake correction processing is written back in the storage medium, so information for performing camera shake correction processing need not be left in the storage medium or shift information storage unit. Since video data stored in the storage medium is one having undergone camera shake correction processing, high-quality video data in which generation of camera shake is suppressed can be obtained regardless of the video recording apparatus for playback or the video display apparatus for display.

Fourth Embodiment

In the first embodiment, an image shift is detected prior to playback. A period during which camera shake has occurred, and a maximum shift amount during this period are obtained from the detected shift information. An optimum playback size during the corresponding period is obtained from the maximum shift amount, and memory read processing and enlarge processing are performed. Hence, an optimum playback image quality can be attained during the detected camera shake period without impairing shooting effects such as panning and tilting. In the second embodiment, an image shift is detected prior to display. A period during which camera shake has occurred, and a maximum shift amount during this period are obtained from the detected shift information. An optimum display size during the corresponding period is obtained from the maximum shift amount, and memory read processing and enlarge processing are performed. An optimum display image quality can be attained during the detected camera shake period. The third embodiment has described the arrangements of a video recording apparatus and video display apparatus which write back camera shake-corrected video data in a storage medium.

However, in an example of the arrangement of the video display apparatus described in the second and third embodiments, an image shift is detected prior to display. A period during which camera shake has occurred, and a maximum shift amount during this period are obtained from the detected shift information. Then, an optimum display size during the corresponding period needs to be obtained from the maximum shift amount. For this reason, input video data can neither undergo camera shake correction processing nor be displayed in real time. In the first and third embodiments, the video recording apparatus requires a memory and resolution conversion unit, and the processing circuit scale of the apparatus becomes large.

In the forth embodiment, the storage medium of a video recording apparatus is used to obtain an image shift prior to playback, a period during which camera shake has occurred, and a maximum playback size during this period, and send these pieces of information to a video display apparatus together with video data. The video display apparatus executes camera shake correction processing on the basis of these pieces of information. This can prevent an increase in the circuit scale of the video recording apparatus. The video display apparatus performs camera shake correction processing in real time to display video data. The fourth embodiment will explain the arrangement of this video recording/display system (video processing system).

Figure 11:
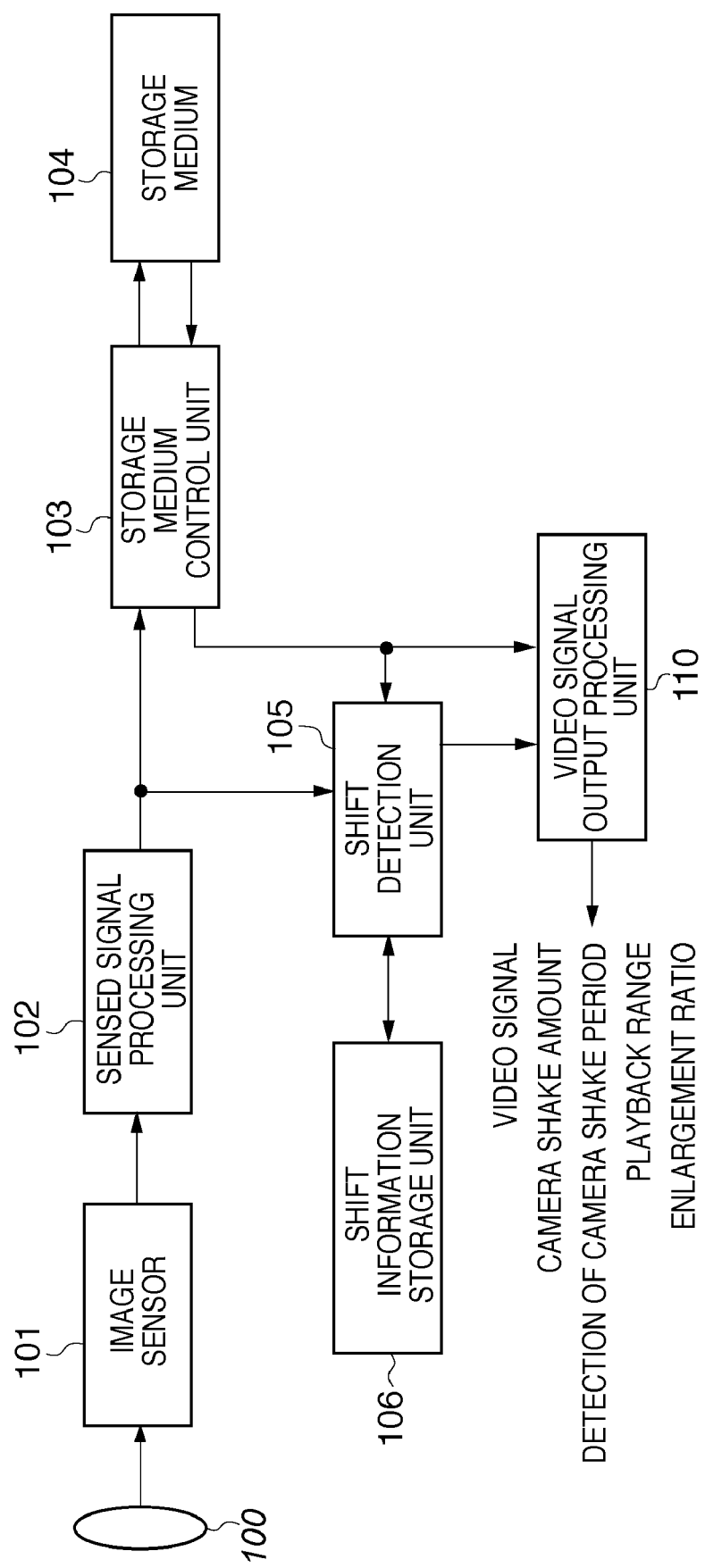
FIG. 11 is a block diagram showing the arrangement of a video recording apparatus according to the fourth embodiment of the present invention.

FIG. 11 is a block diagram showing the arrangement of a video recording apparatus according to the fourth embodiment. The memory control unit 107, memory 108, and resolution conversion unit 109 are omitted from the video recording apparatus shown in FIG. 1 in the first embodiment. Camera shake amount information, camera shake period information, playback range information, and enlargement ratio information detected by a shift detection unit 105 are output to a video signal output processing unit 110. The video signal output processing unit 110 outputs these pieces of information together with a video signal. The remaining arrangement is the same as that shown in FIG. 1.

The operation of the video recording apparatus having the above-described arrangement will be explained.

The operation until video data which is captured by a lens 100 and image sensor 101, processed by a sensed signal processing unit 102, and output from it is stored in a storage medium 104 via a storage medium control unit 103, and the operation until a shift detection unit 105 obtains a motion vector shown in FIG. 2 from video data (target frame) output from the sensed signal processing unit 102 and video data (reference frame) of a preceding frame output from the storage medium control unit 103, detects camera shake amount information, camera shake period detection information, playback range information, and enlargement ratio information from the motion vector information, and stores these pieces of information in a shift information storage unit 106 are also the same as those described with reference to FIG. 1, and a description thereof will not be repeated.

When the user designates playback of video data recorded on the storage medium 104, the storage medium control unit 103 reads out recorded video data from the storage medium 104, and outputs it to the video signal output processing unit 110. At the same time, the shift detection unit 105 reads out camera shake amount information, camera shake period detection information, playback range information, and enlargement ratio information from the shift information storage unit 106, and outputs them to the video signal output processing unit 110. The video signal output processing unit 110 outputs, together with a generated synchronization signal, the video data output from the storage medium control unit 103, and the camera shake amount information, camera shake period detection information, playback range information, and enlargement ratio information output from the shift detection unit 105.

Figure 12:
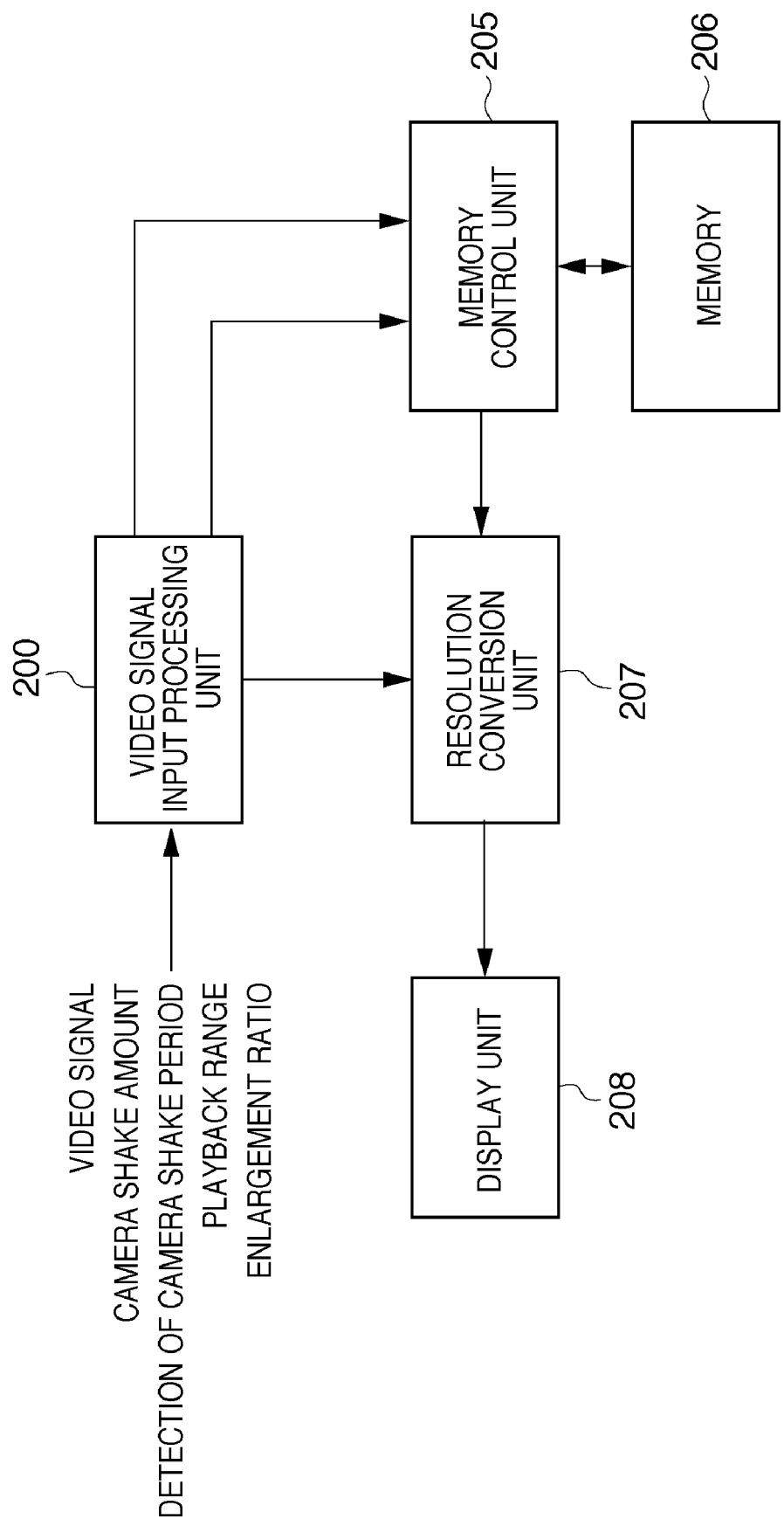
FIG. 12 is a block diagram showing the arrangement of a video display apparatus according to the fourth embodiment of the present invention.

FIG. 12 is a block diagram showing the arrangement of a video display apparatus according to the fourth embodiment. The storage medium control unit 201, storage medium 202, shift detection unit 203, and shift information storage unit 204 are omitted from the video display apparatus shown in FIG. 7 in the second embodiment. A video signal input processing unit 200 separates video data, camera shake amount information, camera shake period detection information, playback range information, and enlargement ratio information. The video data, camera shake amount information, and playback range information are output to a memory control unit 205. The enlargement ratio information is output to a resolution conversion unit 207. The camera shake period detection information is output to the memory control unit 205 and resolution conversion unit 207. The remaining arrangement is the same as that shown in FIG. 7.

The operation of the video display apparatus having the above-described arrangement will be explained.

The video signal input processing unit 200 separates a synchronization signal from a video signal output from the video recording apparatus shown in FIG. 11, and generates video data. At the same time, the video signal input processing unit 200 separates camera shake amount information, camera shake period detection information, playback range information, and enlargement ratio information. The video signal input processing unit 200 outputs the video data, camera shake amount information, camera shake period detection information, and playback range information to the memory control unit 205. The video signal input processing unit 200 outputs the enlargement ratio information and camera shake period detection information to the resolution conversion unit 207. The memory control unit 205 temporarily stores the video data output from the video signal input processing unit 200 in a memory 206. When the camera shake period detection information is effective, the memory control unit 205 reads out the video data from the memory 206 in accordance with the camera shake amount information and playback range information, and outputs it to the resolution conversion unit 207. When the camera shake period detection information is ineffective, the memory control unit 205 directly reads out and outputs the video data stored in the memory 206. When the camera shake period detection information is effective, the resolution conversion unit 207 converts the number of pixels of video data output from the memory control unit 205 into an original display size in accordance with the enlargement ratio information output from the video signal input processing unit 200, as represented by 5c of FIG. 5. Then, the resolution conversion unit 207 outputs the converted video data. The video data output from the resolution conversion unit 207 is output to the display unit 208, and displayed.

The above-described arrangement can simplify the arrangements of the video recording apparatus and video display apparatus by effectively utilizing and sharing their original functions.

Other Embodiments

The object of the embodiments is also achieved by the following method. More specifically, a storage medium (or recording medium) which stores the program codes of software for implementing the functions of the above-described embodiments is supplied to a system or apparatus. The computer (or the CPU or MPU) of the system or apparatus reads out and executes the program codes stored in the storage medium. In this case, the program codes read out from the storage medium implement the functions of the above-described embodiments, and the storage medium which stores the program codes constitutes the present invention. The functions of the above-described embodiments are implemented when the computer executes the readout program codes. Also, the present invention includes a case where an OS (Operating System) or the like running on the computer performs part or all of actual processing on the basis of the instructions of the program codes and thereby implements the functions of the above-described embodiments.

Further, the present invention includes the following case. More specifically, the program codes read out from the storage medium are written in the memory of a function expansion card inserted into the computer or the memory of a function expansion unit connected to the computer. Then, the CPU of the function expansion card or function expansion unit performs part or all of actual processing on the basis of the instructions of the program codes, thereby implementing the functions of the above-described embodiments.

When the present invention is applied to the storage medium, the storage medium stores program codes corresponding to the above-described sequences.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-327985, filed Dec. 19, 2007, which is hereby incorporated by reference herein in its entirety.

What is claimed is:

1. A video processing apparatus comprising:
   a signal input unit which receives a video signal;
   a memory control unit which stores all N frames to a memory, wherein N is an integer not less than two and represents a number of frames of input video data, and that then reads out the N frames to perform camera shake correction during playback of the N frames from the memory;
   a shift detection unit which detects a shift period in shooting and a maximum shift amount during the shift period from entire N frames;
   an effective area detection unit which detects an object area common throughout the shift period as an effective area on the basis of the shift period and the maximum shift amount;
   a correction unit which corrects a shift during the shift period by reading out data from the effective area; and
   a resolution conversion unit which performs enlarge processing to convert a size of the effective area read out by the correction unit into an output image size.

2. The apparatus according to claim 1, further comprising a display unit which displays the effective area having undergone the enlarge processing by the resolution conversion unit.

3. The apparatus according to claim 1, the shift detection unit detects the shift period in shooting and the maximum shift amount during the shift period in a case that the video processing apparatus is not in a panning state.

4. A video processing system comprising an image sensing apparatus which senses an object image to generate a video signal, and a display apparatus which displays a video signal generated by the image sensing apparatus,
   the image sensing apparatus comprising:
     an image sensor which senses an object image;
     a memory control unit which stores all N frames to a memory, wherein N is an integer not less than two and represents a number of frames of generated video data, and that then reads out the N frames to perform camera shake correction during playback of the N frames from the memory;
     a shift detection unit which detects a shift period in shooting and a maximum shift amount during the shift period from a entire N frames;
     an effective area detection unit which detects an object area common throughout the shift period as an effective area on the basis of the shift period and the maximum shift amount; and
     a correction unit which corrects a shift during the shift period by reading out data from the effective area, and
   the display apparatus comprising:
     an input unit which receives a video signal generated by the image sensing apparatus; and
     a resolution conversion unit which performs enlarge processing to convert a size of the effective area read out by the correction unit into an output image size.

5. A video processing method comprising:
   receiving a video signal;
   storing all N frames to a memory, wherein N is an integer not less than two and represents a number of frames of received video data, and that then reading out the N frames to perform camera shake correction during playback of the N frames from the memory;
   detecting a shift period in shooting and a maximum shift amount during the shift period from entire N frames;

detecting an object area common throughout the shift period as an effective area on the basis of the shift period and the maximum shift amount;

correcting a shift during the shift period by reading out data from the effective area; and performing enlarge processing to convert a size of the effective area read out into an output image size.

6. A non-transitory computer medium having encoded thereon a computer program comprising a set of instructions when executed by a computer to implement a method for video processing, the method comprising the steps of:

receiving a video signal;

storing all N frames to a memory, wherein N is an integer not less than two and represents a number of frames of received video data, and that then reading out the N frames to perform camera shake correction during playback of the N frames from the memory;

detecting a shift period in shooting and a maximum shift amount during the shift period from entire N frames;

detecting an object area common throughout the shift period as an effective area on the basis of the shift period and the maximum shift amount;

correcting a shift during the shift period by reading out data from the effective area; and performing enlarge processing to convert a size of the effective area read out into an output image size.

* * * * *